(12) United States Patent
Michaud et al.

(10) Patent No.: US 9,104,436 B1
(45) Date of Patent: Aug. 11, 2015

(54) COMPILE DIRECTIVES FOR MEMORY MANAGEMENT

(71) Applicant: EMC Corporation, Hopkinton, MA (US)

(72) Inventors: Adrian Michaud, Carlisle, MA (US); Roy Clark, Hopkinton, MA (US); Kenneth Taylor, Franklin, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 14/289,065

(22) Filed: May 28, 2014

(51) Int. Cl.
*G06F 9/45* (2006.01)
(52) U.S. Cl.
CPC .............. *G06F 8/4434* (2013.01); *G06F 8/41* (2013.01); *G06F 8/427* (2013.01)
(58) Field of Classification Search
CPC ............ G06F 8/443; G06F 8/427; G06F 8/41
USPC ......................................... 717/140, 143, 151
See application file for complete search history.

(56) References Cited

U.S. PATENT DOCUMENTS

| | | | | |
|---|---|---|---|---|
| 5,297,279 | A * | 3/1994 | Bannon et al. | 707/792 |
| 5,437,027 | A * | 7/1995 | Bannon et al. | 1/1 |
| 5,765,174 | A * | 6/1998 | Bishop | 1/1 |
| 6,178,519 | B1 * | 1/2001 | Tucker | 714/4.4 |
| 6,963,960 | B2 * | 11/2005 | Marinescu et al. | 711/165 |
| 2004/0243833 | A1 * | 12/2004 | Spacey | 713/200 |
| 2007/0294499 | A1 * | 12/2007 | Garthwaite | 711/170 |
| 2008/0028153 | A1 * | 1/2008 | Marwinski | 711/130 |

OTHER PUBLICATIONS

D. Detlefs, "Concurrent Garbage Collection for C++", May 4, 1990.*

* cited by examiner

*Primary Examiner* — Phillip H Nguyen
(74) *Attorney, Agent, or Firm* — Daly, Crowley, Mofford & Durkee, LLP

(57) ABSTRACT

An address validation/relocation storage class provides a mechanism for application software to selectively control the virtual memory addresses used by the compiler generated machine code. Applications can use the address validation/relocation storage class to validate memory addresses and/or relocate data between memory tiers. A persistent memory storage class provides a mechanism for application software to selectively persist static data.

19 Claims, 9 Drawing Sheets

```
502  #include <string.h>
504
506  validation char *memory _attribute_((hander=translate));
508
510  int main(void)
512  {
514         strcpy(memory     , "hello");
516         strcpy(&memory[16], "hello");
518         strcpy(memory+32  , "hello");
520  }
522
524  char buffer[256];
526  char *translate(char *address)
528  {
530         // Translate address relative to buffer.
532         return(buffer+address);
534  }
```

*FIG. 5*

```
538  mov      $0x0,%rax
540  mov      $0x4005f8,%esi
542  callq    _translate
544  mov      %rax,%rdi
546  callq    strcpy
```

*FIG. 5A*

```
550  mov      $0x10,%rax
552  mov      $0x4005f8,%esi
554  callq    _translate
556  mov      %rax,%rdi
558  callq    strcpy
```

*FIG. 5B*

```
562  mov      $0x20,%rax
564  mov      $0x4005f8,%esi
566  callq    _translate
568  mov      %rax,%rdi
570  callq    strcpy
```

*FIG. 5C*

```
802   #include <string.h>
804
806   persist char memory[256];
808
810   int main(void)
812   {
814           strcpy(memory, "hello");
816   }
```

COMPILE DIRECTIVES FOR MEMORY MANAGEMENT

COPYRIGHT NOTICE

A portion of the disclosure of this patent document contains material that may be subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

A data storage system environment typically includes one or more host computing devices ("hosts") in communication with one or more storage arrays. A host typically executes an application program (e.g., a database application) which requires data associated with the application to be stored locally (i.e., on the host), remotely (i.e., on one of the storage arrays), or stored both locally and remotely. The host typically includes memory devices that provide both volatile random access memory capacity (e.g., Dynamic RAM or DRAM devices) and non-volatile random access memory capacity (e.g., flash memory devices). The storage array typically includes storage devices that provide non-volatile random access storage capacity (e.g., flash memory devices) and non-volatile large storage capacity (e.g., hard disk drives (HDDs) and tape drives). In general, random access memory is used to satisfy high throughput and/or bandwidth requirements of a given application program while the hard disk and tape drives are used to satisfy capacity requirements.

In a data storage environment, the ability to define multiple, independent memory tiers is desired. A memory tier is typically constructed by memory mapping a region of a storage class memory (SCM) device (e.g., a flash memory) or a region of an array storage device into the process's virtual memory address space. The memory-mapped regions may be fronted by a DRAM page cache to which the application issues loads and stores. Memory tiering applications move data between the SCM (or array device) and the DRAM page cache on an on-demand page basis.

SUMMARY

It would be useful to provide compiler directives to enable memory tiering applications to selectively move data between memory and storage devices on a per-object basis. Moreover, it would be useful to provide a compiler storage directive for application software to selectively persist data on a per-object basis.

Accordingly, a computer-implemented method comprises: parsing source code; identifying, in the source code, a declaration comprising an object reference and a handler function; identifying, in the source code, a statement de-referencing the referenced object; and generating machine code representative of the statement, the machine code comprising instructions to determine a memory address of the referenced object using the handler function.

According to another aspect, a computer program product is tangibly embodied in a non-transitory computer-readable medium, the computer-readable medium storing machine code. The machine code is generated from source code having a declaration comprising an object reference and a handler function. The machine code is executable to: copy an offset associated with the de-referencing to a register corresponding to the handler function input; call the handler function; and copy a memory address from a register corresponding to the handler function output. According to yet another aspect, the computer-readable medium is included within a storage system which further includes a processor and one or more memory devices.

Embodiments of the method, computer program product, and storage system include one or more of the following features. The memory address may be associated with a storage class memory (SCM) device and/or a memory-mapped file. The declaration may be identified by a compiler directive (e.g., a "validation" keyword). The machine code may comprise an instruction to copy an offset associated with the de-referencing to a register corresponding to the handler function input; an instruction to call the handler function; and an instruction to copy a memory address from a register corresponding to the handler function output. The handler function may validate the offset. The handler function may copy data from a first memory device to a second memory device and the memory address is associated with the second memory device. The object reference comprises a pointer. The memory address may be a virtual memory address.

BRIEF DESCRIPTION OF THE DRAWINGS

The concepts, structures, and techniques sought to be protected herein may be more fully understood from the following detailed description of the drawings, in which:

FIG. 5 is a computer program listing of source code illustrating an address validation/relocation storage class;

FIGS. 5A-5C are computer program listings of machine code corresponding to portions of the source code in FIG. 5;

Figure 1:
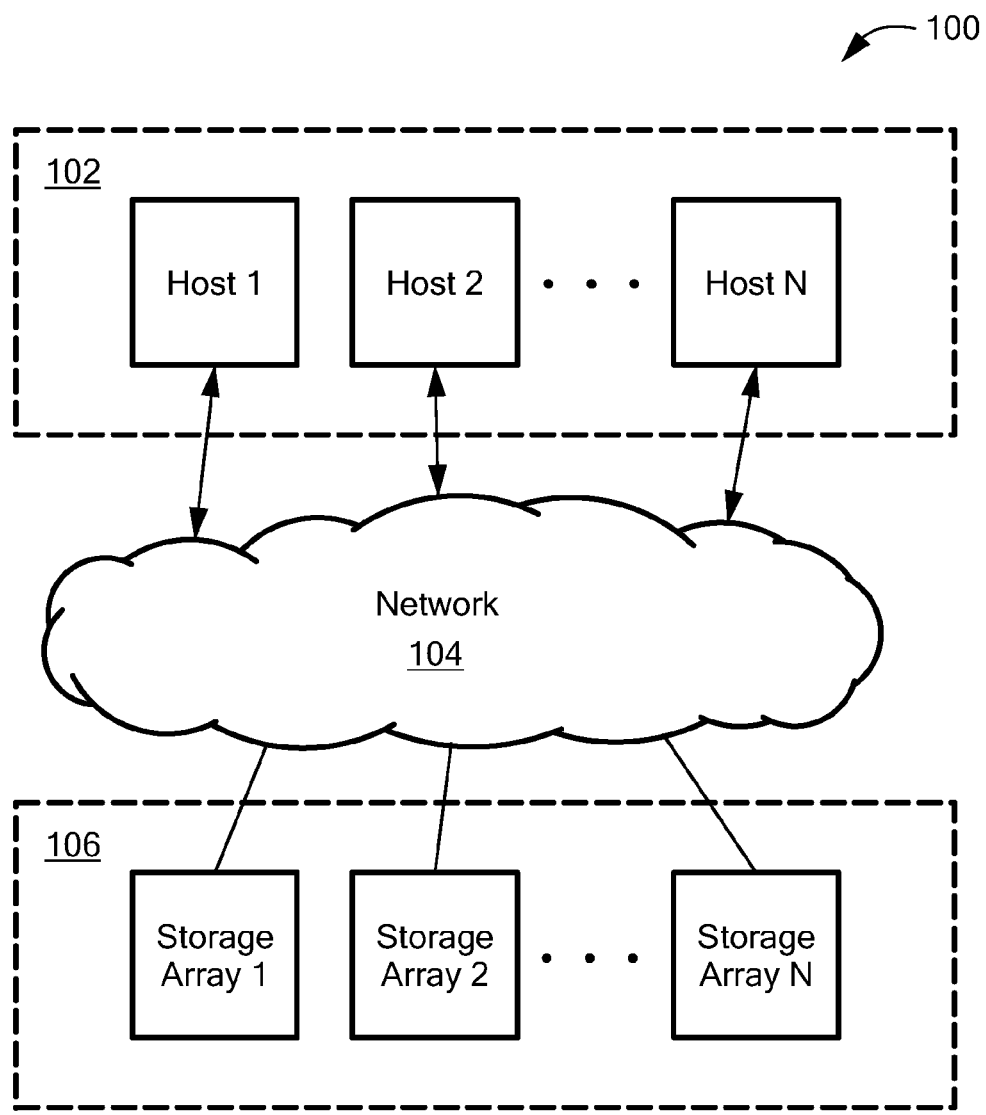
FIG. 1 is a network diagram illustrating a data memory and storage system environment.

The drawings are not necessarily to scale, or inclusive of all elements of a system, emphasis instead generally being placed upon illustrating the concepts, structures, and techniques sought to be protected herein.

DETAILED DESCRIPTION

Embodiments of the present invention will be described herein with reference to exemplary computing systems, data memory and storage systems, and associated servers, computers, memory devices, storage devices and other processing devices. It is to be appreciated, however, that embodiments of the invention are not restricted to use with the particular illustrative system and device configurations shown.

Before describing embodiments of the concepts, structures, and techniques sought to be protected herein, some terms are explained. The phrases "computer," "computing system," "computing environment," "processing platform," "data memory and storage system," and "data memory and storage system environment" as used herein with respect to various embodiments are intended to be broadly construed, so as to encompass, for example, private or public cloud computing or storage systems, or parts thereof, as well as other types of systems comprising distributed virtual infrastructure and those not comprising virtual infrastructure.

The terms "application," "program," "application program," and "computer application program" herein refer to any type of software application, including desktop applications, server applications, database applications, and mobile applications. The terms "application process" and "process" refer to an instance of an application that is being executed within a computing environment. As used herein, the term "object" refers to a logic grouping of data within an application, including primitive data types (e.g. integers and characters), arrays, trees, structures, unions, hashes, etc. The term "object reference" herein refers to any type of reference to an object, such as a pointer.

The term "source code" refers to computer instructions in a high-level programming language, such as C, C++, Java, Ruby, Python, etc. The term "machine code" refers to: (1) a set of instructions executed directly by a computer's processor or a virtual machine processor; and (2) such instructions expressed in the assembly language. The term "compiler directive" is used herein to refer to reserved syntax which controls the operation of a compiler and which is separate from normal computer instructions. Non-limiting examples of compiler directives include pre-processor directives and storage classes.

The term "memory" herein refers to any type of computer memory accessed by an application using memory access programming semantics, including, by way of example, dynamic random access memory (DRAM) and memory-mapped files. Typically, reads or writes to underlying devices is done by an operating system (OS), not the application. As used herein, the term "storage" refers to any resource that is accessed by the application via input/output (I/O) device semantics such as read and write systems calls. In certain instances, the same physical hardware device could be accessed by the application as either memory or as storage.

As used herein, the term "tiering" refers to the placement of information on an infrastructure resource commensurate with implementation of a defined policy. Such policies can take factors into account a variety of factors including, but not limited to: information utilization usage statistics (e.g., I/O reads, writes, memory access); customer information values associated with levels of service (e.g., gold, silver, bronze, production, test, sandbox, archive); and any other custom tiering stratification criteria.

FIG. 1 shows an illustrative data memory and storage system environment 100 comprising a plurality of application host computing devices ("application hosts") 102 operatively coupled to one or more storage arrays 106 via a network 104. The network 104 may be any known communication network or combination of networks including networks using protocols such as, but not limited to, Ethernet, Internet Small Computer System Interface (iSCSI), Fibre Channel (FC), wireless protocols, etc.

The application hosts 102 are configured to execute applications, such as database applications. An application host 102 is typically a server (e.g., a Windows server, a Sun Solaris server, an HP server, a Linux server, etc.) upon which the application executes. A storage array 106, which may be a storage area network (SAN) array, comprises one or more storage products such as, by way of example, VNX and Symmetrix VMAX, both commercially available from EMC Corporation of Hopkinton, Mass. A variety of other storage products may be utilized to implement at least a portion of a storage array.

In general operation, an application host executes the application using local memory resources and issues read and write requests ("commands") to a storage array 106. The storage array 106 is configured with storage resources used to store backend data files. The storage array 106 processes read and write commands received from the application host and, in the case of a read request, sends data stored thereon back to the requesting host.

In one aspect, the illustrative environment 100 provides a memory and storage tier architecture (or "structure"). The tier structure comprises one or more tiers resident on an application host 102 and one or more tiers resident on a storage array 106. As discussed further below, applications residing on the application hosts 102 determine (either automatically or in response to user input) on which of the various tiers to store data associated with the execution of an application.

Figure 2:
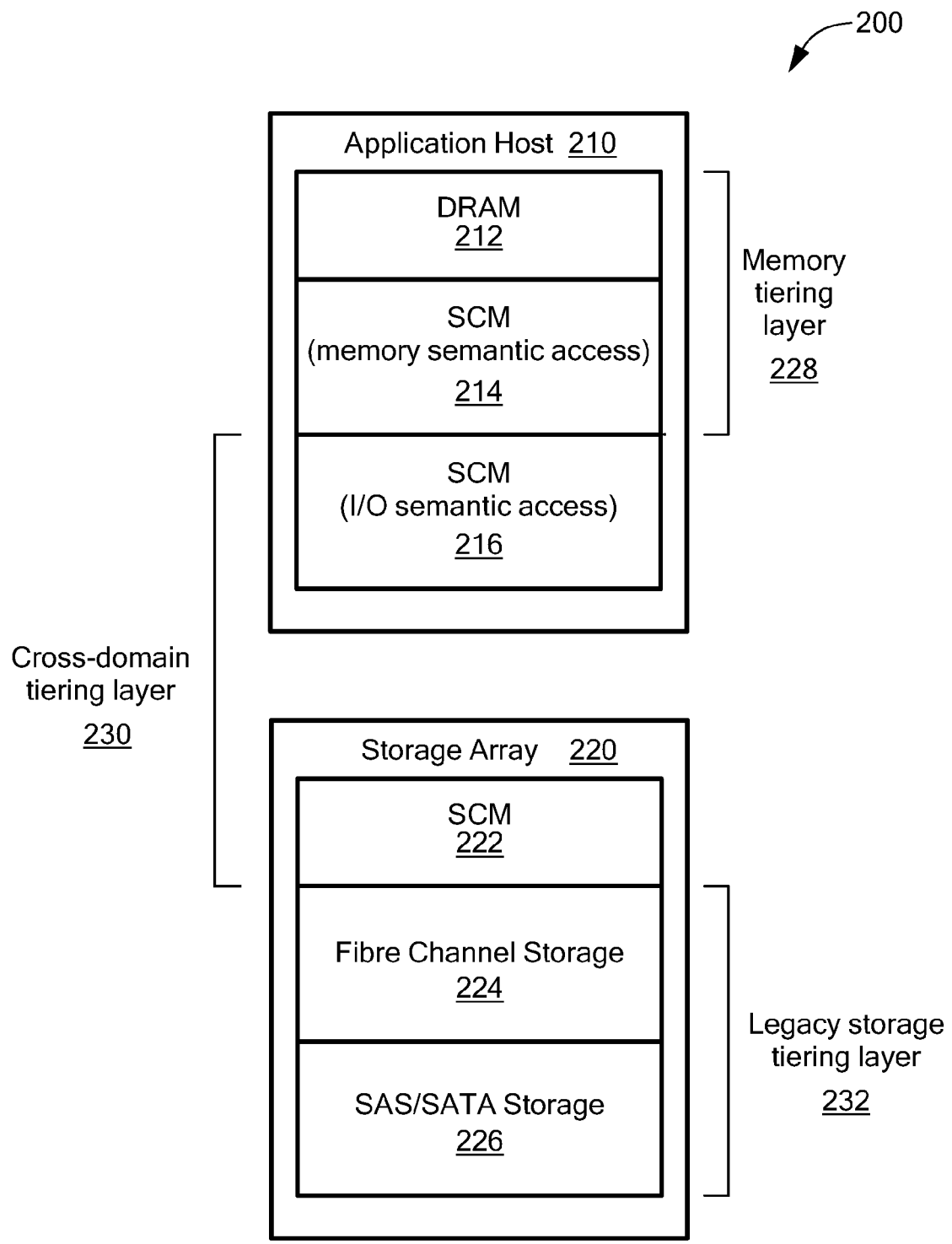
FIG. 2 is a block diagram illustrating a memory and storage tiering structure.

FIG. 2 shows an illustrative memory and storage tier structure 200. The illustrative tier structure 200 spans an application host 210 and a storage array 220, which may be the same as or similar to an application host 102 and a storage array 106 of FIG. 1, respectively. As shown, tiers resident on the application host 210 include a dynamic random access memory tier 212 (e.g., DRAM or other form of volatile random access memory), an SCM tier 214 accessible as a memory resource, and an SCM tier 216 accessible as an I/O resource. As further shown, tiers resident on the storage array 220 include an SCM tier 222 accessible as an I/O resource, a network (e.g., Fibre Channel) storage tier 224, and serial attached storage (SAS/SATA) tier 226.

The SCM 214 tier comprises one or more SCM devices. Non-limiting examples of SCM devices include NAND flash, solid state drives (SSDs), next generation non-volatile memory (NVM) drives/cards/dual in-line memory modules (DIMMs), NAND RAM, phase change memory (PCM) RAM, and spin torque (ST) RAM. In embodiments, an SCM device is connected via a PCI-E bus.

In one aspect, the tier structure 200 provides a memory tiering layer 228 (via memory tiers 212 and 214), a cross-domain tiering layer 230 (via SCM I/O accessible tiers 216 and 222), and a legacy storage tiering layer 232 (via storage tiers 224 and 226). Thus, an application can make data placement selections end-to-end (i.e., across the memory tiering layer, the cross-domain tiering layer, and the legacy storage tiering layer) or within a single within a tiering layer.

Figure 3:
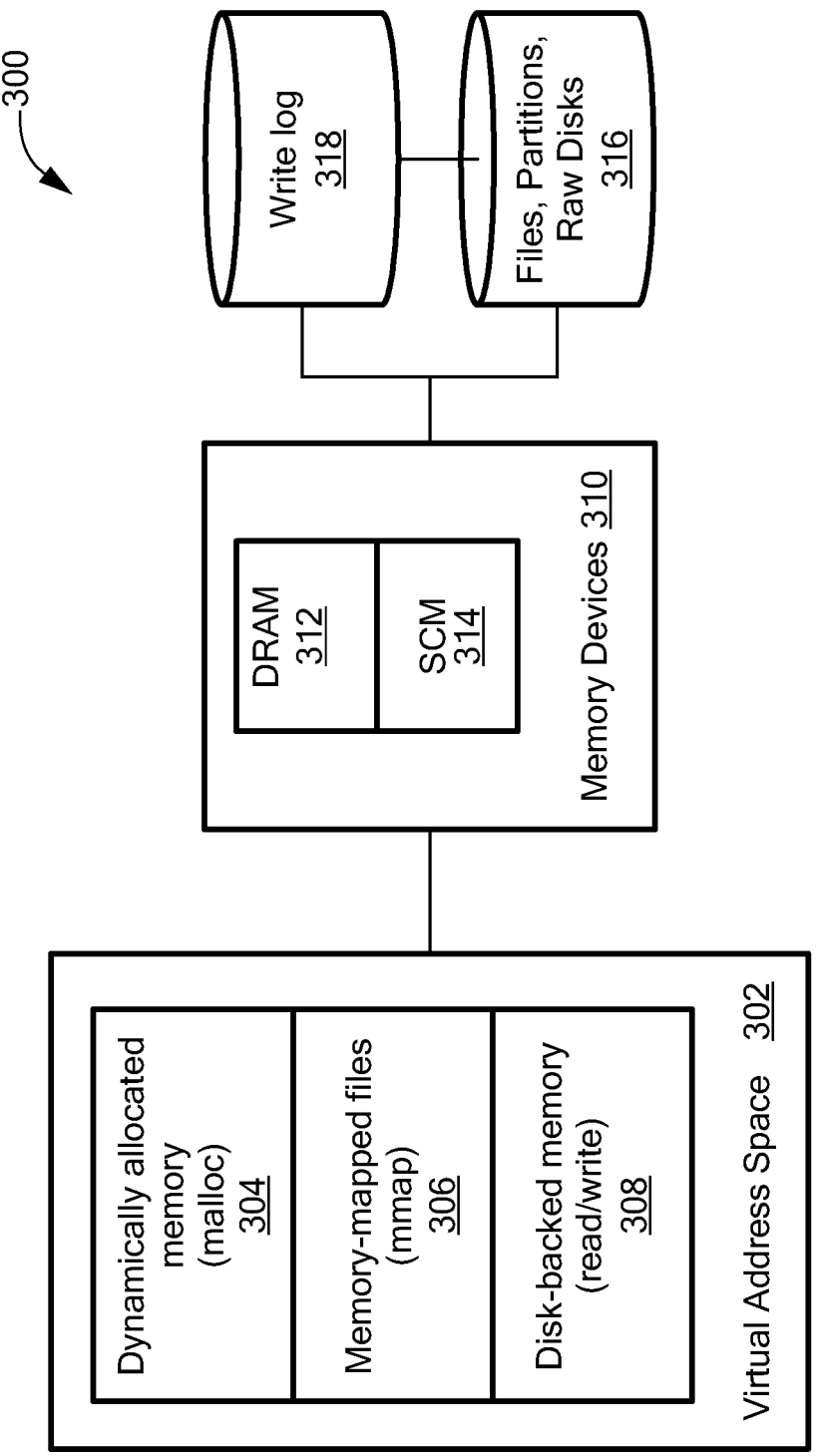
FIG. 3 is a block diagram illustrating a memory tiering layer.

FIG. 3 shows an illustrative memory tiering layer 300, which may be the same as or similar to memory tiering layer 228 of FIG. 2. As shown, the memory tiering layer 300 includes a virtual memory address space 302 comprising dynamically allocated memory 304, memory-mapped files 306, and disk-based memory 308. The virtual memory address space is backed by one or more physical memory devices 310, such as DRAM 312 and SCM 314. In embodiment, the memory tiering layer 300 further includes files, partitions and raw disks 310 and/or write logs 312.

In embodiments, the SCM 314 is exposed to an application as an "extended" tier of memory available for use that has performance characteristics that are different from the DRAM. Such performance characteristics can be taken into account when deciding what data to place into extended memory tiers. For example, some characteristics of extended memory tiers include, but are not limited to: SCM is directly accessible as memory; SCM significantly increases available capacity for all three memory allocation components, i.e., dynamically allocated memory (malloc), memory-mapped (mmap) files, and disk-backed memory; a page fault handler can still move (4 KB) pages in and out from storage for memory-mapped file pages; and a FileIO stack reads in pages for disk-backed memory, with writes being accomplished either synchronously or asynchronously.

The illustrative virtual memory address space 300 may correspond to the address space of a process executing on an application host (e.g., a host 102 in FIG. 1) or on a storage array (e.g., storage array 106 in FIG. 1). An application may access the SCM as memory-mapped files, such using the mmap system call known to those skilled in the art. Application developers are enabled to do this while still coding their systems using a memory based semantic. This allows, for example, the movement of data from traditional DRAM memory locations to SCM-backed memory locations.

Figure 4:
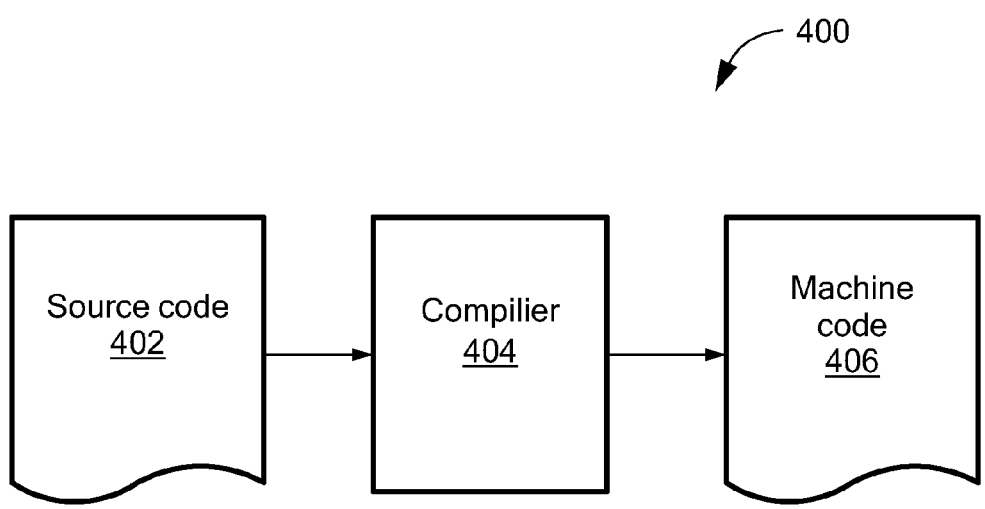
FIG. 4 is a block diagram illustrating a compiler environment.

Referring now to FIG. 4, an illustrative compiler environment 400 comprises source code 402, a compiler 404, and machine code 406. The source code 402 includes syntax of a "high-level" programming language (e.g., C or C++) and the machine code 406 includes corresponding machine instructions (e.g., x86 instructions) expressed as assembly code and/or in binary form. In embodiments, the source code and machine code are provided as files, streams, and/or databases. The compiler 404 is an application program configured to receive source code 402 and to convert the source code to machine code 406 using compiler techniques known to those skilled in the art. For example, the compiler 404 may perform lexical analysis and syntax/semantic analysis on source code to generate an intermediate representation, and then perform code generation to convert the intermediate representation to machine code.

In embodiments, the compiler 404 is extensible, meaning that new features (e.g., custom storage classes and code generators) can be readily added to the compiler, such as via a plugins mechanism. In embodiments, the compiler 404 is based on the GNU Compiler Collection (GCC) produced by the GNU Project. As is known, GCC includes a C "frontend" and an x86 "backend" to compile C source code into x86 machine code (among several other front-ends and back-ends). GCC also includes a plugin mechanism. It should be understood that, for simplicity of explanation, FIG. 4 does not include all the elements of a typical compiler environment; for example, the environment may include a computer (e.g., computer 1000 in FIG. 10) to host the compiler 404.

FIG. 5 is a computer program listing of source code 500 illustrating an address validation/relocation storage class (referred to hereinafter as a "validation storage class". It will be understood that the source code 500 represents a program in the C programming language. The source code 500 comprises lines 502-534, which include pre-processor directives (e.g., line 502), object declarations (e.g., lines 506 and 524), function declarations (e.g., lines 510 and 526), operations (e.g., lines 514-518 and 532), and other statements.

At line 506, a reference to a global object ("memory") is declared having an validation storage class ("validation"). A compiler (e.g., compiler 404 of FIG. 4) is configured to identify the validation storage class as part of its syntactic/semantic analysis stage. The compiler further identifies an associated handler function ("translate"), which, in this example, is defined as an attribute of the object declaration. As is known, GCC plugins may define their own attributes using syntax such as "_attribute_." The compiler associates the storage class and the handler function with the declared object reference for use during its code generation stage, as described further below.

At line 514, a statement includes a function call ("strcpy") to copy a string literal ("hello") to a memory location of the object reference ("memory"). At line 516, a statement includes a function call to copy the string literal to a virtual memory location of the object reference offset by 16 bytes. At line 518, a statement includes a function call to copy the string literal to a virtual memory location of the object reference offset by 32 bytes. Thus, it will be understood that lines 514, 516, and 518 each comprise statements that de-reference the object reference declared having a validation storage class.

At lines 526-534, the handler function ("translate") is declared to receive an offset parameter ("address") and defined to return a virtual memory address. In this illustration, the handler function returns the virtual memory address of a global object ("buffer") offset by the number of bytes specified via the offset parameter ("buffer+address"). It should be appreciated that the handler function shown in FIG. 5 is merely illustrative and, in general, a handler function may perform any desired functionality, including but not limited to address validation and data relocation.

As is known to those skilled in the art, traditional compiler-generated code for load and store use fixed data segment offsets, fixed instruction relative offsets, or dynamically calculated offsets (e.g., pointer arithmetic). The generated code typically de-references an object reference. Attempting to de-reference an uninitialized object reference (i.e., an invalid virtual memory address such as NULL) will cause a page fault or segmentation violation. Thus, for example, machine code generated by a traditional compiler in response to program listing 500 would, when executed, cause a page fault/segmentation violation because the referenced object ("memory") is de-referenced prior to being initialized (i.e., at line 514).

FIGS. 5A, 5B, and 5C are computer program listings of illustrative machine code 536, 548, and 560, respectively. It will be understood that machine code 536, 548, 560 represents computer programs in assembly language (e.g., x86 assembly). The machine code 536, 548, 560 corresponds to respective portions of the source code 500 (FIG. 5), as described below. It should be understood that the machine code 536, 548, 560 is not intended to correspond to a complete compilation of the source code 500. In particular, the machine code 536, 548, 560 is intended to illustrate how a compiler uses a specified handler function to dynamically calculate virtual memory addresses. It will be understood that the illustrative machine code is non-optimized, but that that the techniques described herein can be used in conjunction with known compiler optimization techniques.

In FIG. 5A, a compiler generates machine code 536 corresponding to line 514 in the source code 500 (FIG. 5). The validation storage class instructs the compiler to generate specialized machine code to de-reference the object reference ("memory"). In particular, whereas a traditional compiler generates machine code to directly de-reference the object reference, here the compiler generates code which uses the handler function ("translate") to dynamically calculate a virtual memory address.

At line 538, an offset (0x0) is copied to register % rax. It will be appreciated that this zero-byte offset is implied within the source code statement at line 514. At line 540, the virtual memory address of the string literal "hello" is copied to register % esi; and, at line 542, the handler function ("translate") is called. The handler function loads the offset from register % rax and returns a virtual memory address in register % rax. At line 544, the returned virtual memory address is copied from register % rax to register % rdi. At line 546, a strcpy function, which may be defined within a standard system library or within a compiler library, is called. The strcpy function copies data from a first virtual memory location (specified by the % esi register) to a second virtual memory location (specified by the % rdi register). Thus, in this example, the machine code 536 copies the string literal "hello" to the global object "buffer."

In FIG. 5B, a compiler generates machine code 548 corresponding to line 516 in the source code 500 (FIG. 5). Thus, at line 550, an offset 0x10 (the hexadecimal representation of "16") is copied to register % rax. Lines 552-558 are the same as lines 540-546, respectively, shown in FIG. 5A.

In FIG. 5C, a compiler generates machine code 560 corresponding to line 518 in the source code 500 (FIG. 5). Thus, at line 562, a relative offset 0x20 (the hexadecimal representation of "32") is copied to register % rax. Lines 564-570 are the same as lines 540-546, respectively, shown in FIG. 5A.

In some embodiments, the compiler enforces strict type checking of the validation storage class such that, within an application, all declarations of a given object (or object reference) must include the validation storage class if any such declarations do.

It should be appreciated that the validation storage class enables application developers to easily implement a wide range of address validation and relocation at the application level. By providing a level of indirection for address lookups, the application gains complete control over object storage and retrieval. Applications can, for example: move data between memory-mapped regions of SCM and DRAM; perform address validation and bounds checking; and/or implement "on-demand" memory allocation.

Figure 6:
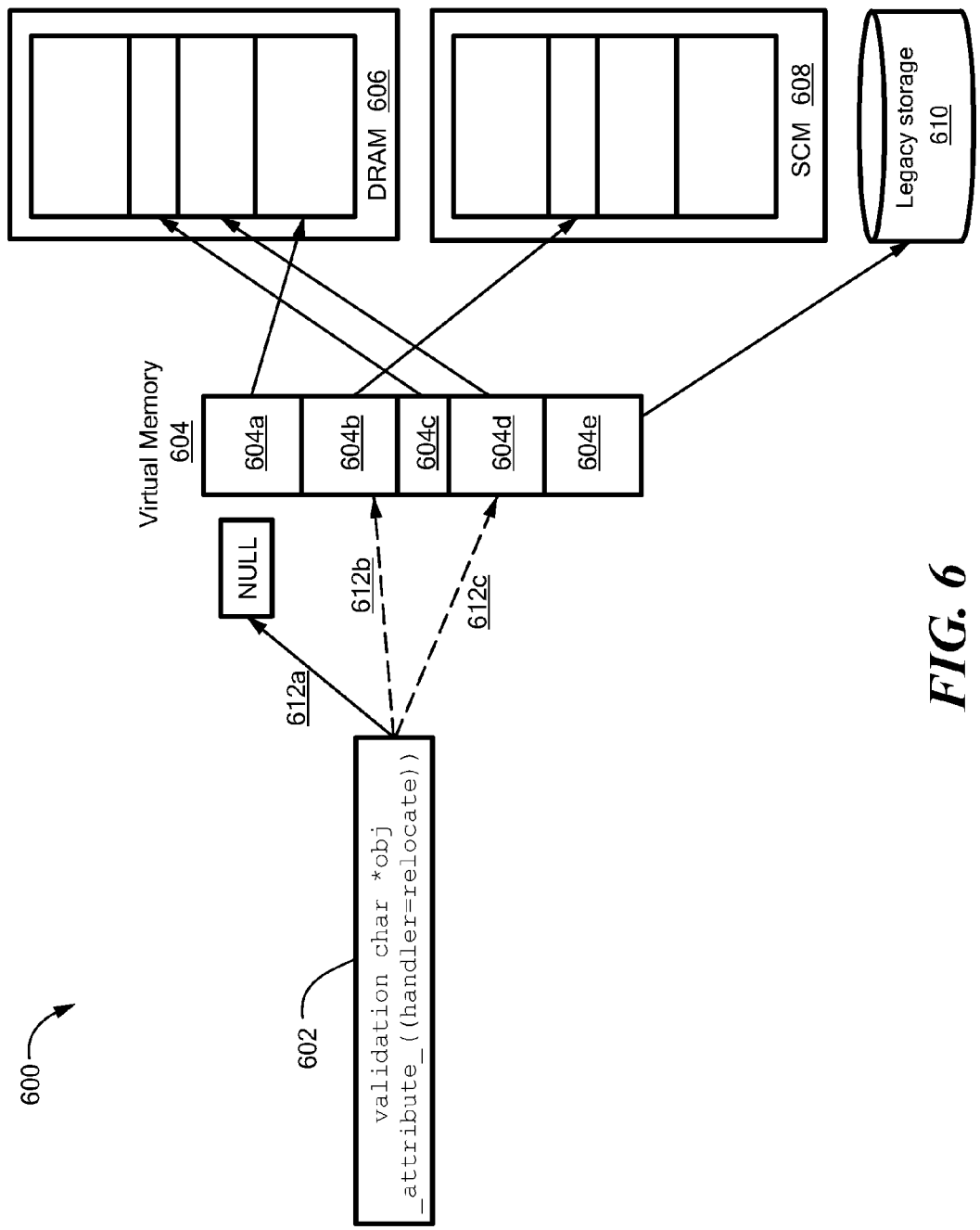
FIG. 6 is an illustration of using an address validation/relocation storage class.

FIG. 6 illustrates using the validation storage class to relocate data between memory tiers. An illustrative application environment 600 includes an object reference 602, a virtual memory 604, DRAM 606, and SCM 608. In some embodiments, legacy storage 610 is also provided (e.g., as a storage array 106 shown in FIG. 1). The object reference 602 may be included within an application on a host (e.g., an application host 102 in FIG. 1), and the virtual memory 604 may be managed by an OS on the same host.

The illustrative virtual memory 604 includes a plurality of virtual memory pages and/or segments (generally referred to as "memory locations" herein) 604a-604e. Likewise, the illustrative DRAM 606, SCM 608, and legacy storage 610 include a plurality of memory/storage locations (e.g., pages, segments, blocks, sectors, etc.). It will be understood that modern operating systems (e.g., Linux) include advanced virtual memory managers (VMMs) to automatically allocate per-process virtual memory address spaces and map virtual memory locations (e.g., pages) to physical memory locations.

At a given time, each virtual memory location 604a-604e may be mapped to a particular physical memory device, such as DRAM 606, SCM 608, or legacy storage 610. The VMM may automatically move data between memory devices. For example, the VMM may "swap" inactive pages to a legacy storage device to free up space in DRAM for active pages. In addition, an application can use memory-mapped files to control which data resides on SCM and/or legacy storage. In this example, virtual memory locations 604a, 604c, and 604d are mapped to DRAM 606, location 604b is mapped to SCM 608, and location 604e is mapped to legacy storage 610.

The illustrative object reference 602 is declared within the application using the validation storage class ("validation"), as shown. The declaration associates the handler function "relocate" with the object reference "obj." As shown by line 612a, the object reference 602 is not initialized and thus may have a default value of NULL (or some other invalid virtual memory address). As described above in connection with FIG. 5, compiler-generated machine code uses the handler function to dynamically calculate the virtual memory address for the object reference. For example, line 612b may represent an operation (e.g., strcpy) to write data to the referenced object. The handler function returns virtual memory location 604b, which is mapped to the SCM 608. Thus, the data is initially written to the SCM 608. Next, an operation reads data from the referenced object, for example to output the user to a display device. At this point, the application may determine (e.g., based on memory tiering policy) that the data should be relocated from SCM 608 to DRAM 606. Thus, the handler function can copy the data between the memory devices 608 and 606 and then return the new location within DRAM 606, as shown by line 612c. Likewise, the application could use the handler function to relocate data to/from legacy storage 610.

Figure 7:
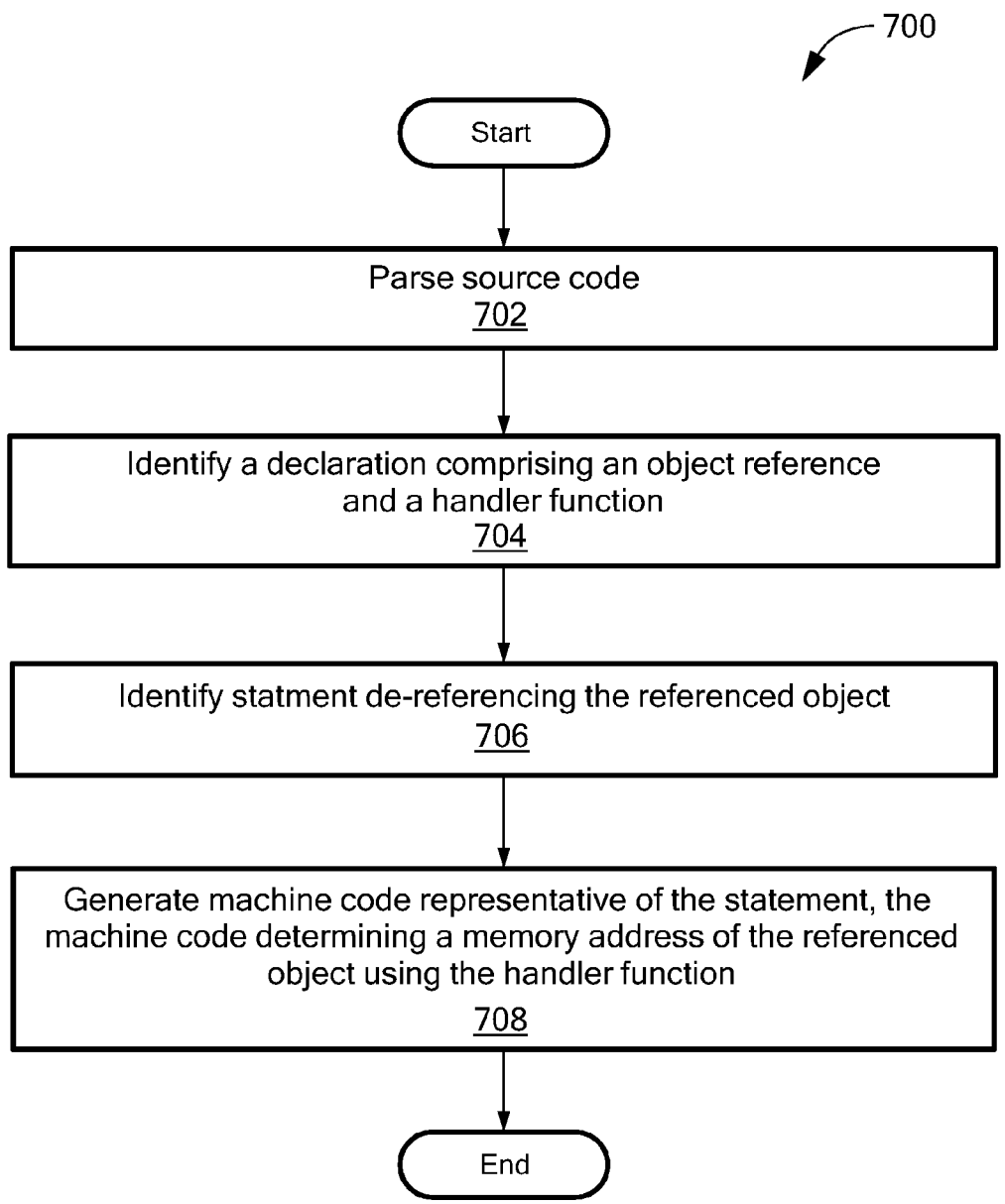
FIG. 7 is a flowchart illustrating a method of compiling source code utilizing an address validation/relocation storage class.
Figures 8, 9:
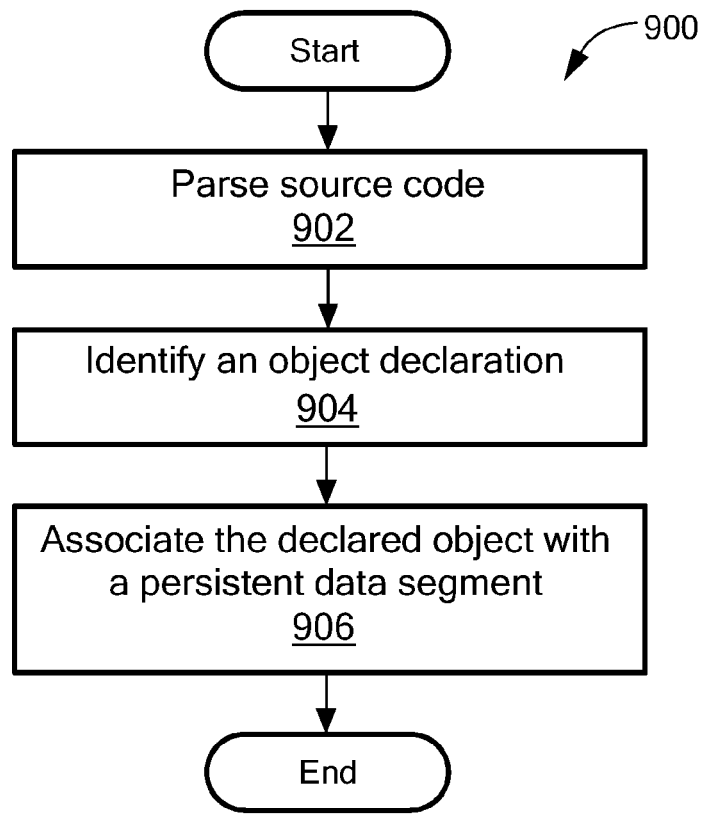
FIG. 8 is a computer program listing of source code illustrating a persistent memory storage directive.
FIG. 9 is a flowchart illustrating a method of compiling source code utilizing a persistent memory storage directive.

FIGS. 7 and 9 are flowcharts corresponding to the below contemplated techniques which may be implemented in a compiler, such as compiler 404 of FIG. 4. Rectangular elements (typified by element 702), herein denoted "processing blocks," represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language, but rather illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the concepts, structures, and techniques sought to be protected herein. Thus, unless otherwise stated the blocks described below are unordered meaning that, when possible, the functions represented by the blocks can be performed in any convenient or desirable order.

Referring to FIG. 7, a method 700 begins at block 702 where source code (e.g., source code 500 in FIG. 5) is parsed. The source code comprises at least one object reference declaration having an associated handler function (e.g., the declaration at line 506 in FIG. 5) and at least one statement de-referencing the referenced object (e.g., the statement at line 514 in FIG. 5). The declaration may use the validation storage class and the handler function may be specified as an attribute. At block 704, the object reference declaration is identified, for example by a "validation" validation storage class keyword. At block 706, the statement is identified. At block 708, machine code representative of the statement is generated. The machine code determines a memory address of the referenced object using the handler function.

It should be appreciated that method 700 may be implemented within a compiler (e.g., as a plugin to a GCC-based compiler). More specifically, processing blocks can be performed during specific stages of compilation. For example, processing blocks 704 and 706 may be performed during lexical analyzer and/or semantic analyzer compiler stage, whereas processing block 708 may be performed during a code generation stage.

FIG. 8 is a computer program listing of source code 800 illustrating a persistent memory storage directive. It will be understood that the source code 800 represents a program in the C programming language. The illustrative source code 800 comprises lines 802-816, which include pre-processor directives (e.g., line 802), object declarations (e.g., line 806), function declarations (e.g., line 810), operations (e.g., line 814), and other statements.

At line 806, an object declaration ("memory") includes a persistent memory storage directive ("persist"). A compiler (e.g., compiler 404 of FIG. 4) is configured (e.g., via a plugin) to identify this directive and to generate/link code to persist the object, meaning that data written to the object is maintained after the program exists/faults. The persistent memory storage directive ("persistent") works in conjunction with an additional runtime (e.g., C-runtime) code that sets up a persistent data segment. The compiler invokes the runtime code and designates this this persistent data segment to store all objects declared using the persistent memory storage directive.

In embodiments, the persistent data segment is memory-mapped to a file, such as a file stored on SCM. As is known in the art, various executable file formats (e.g., Executable and Linkable Format (ELF) and Common Object File Format (COFF)) include data segments. Thus, in some embodiments, the file is the application program's own executable file, or more specifically, a data segment thereof. Here, the data segment can be shared across multiple instances of an application, providing a non-volatile, inter-process communication (IPC) mechanism. In other embodiments, the persistent data segment is mapped to a file other than application program's executable file.

Thus, it will be appreciated that the persistent memory storage directive can be implemented similar to handling of static objects (e.g., objects declared using the "static" keyword within the C programming language). The implementation and resulting operation of the persistent memory storage directive can be based upon existing compiler functionality (e.g., functionality within GCC) for the "static" directive. Thus, a compiler can be configured to generate a new persistent segment, as needed, and locate therein objects declared with the persistent memory storage directive.

In some embodiments, the compiler enforces strict type checking of the persistent storage compiler directive such that, within an application, all declarations of a given object (or object reference) must include the persistent storage compiler directive if any such declarations do.

Referring to FIG. 9, an illustrative method 900 begins at block 902 where source code (e.g., source code 800 in FIG. 8) is parsed. The source code comprises at least one object declaration (e.g., the declaration at line 806 in FIG. 8), which is identified at block 904. At block 906, the declared object is associated with a persistent data segment.

Figure 10:
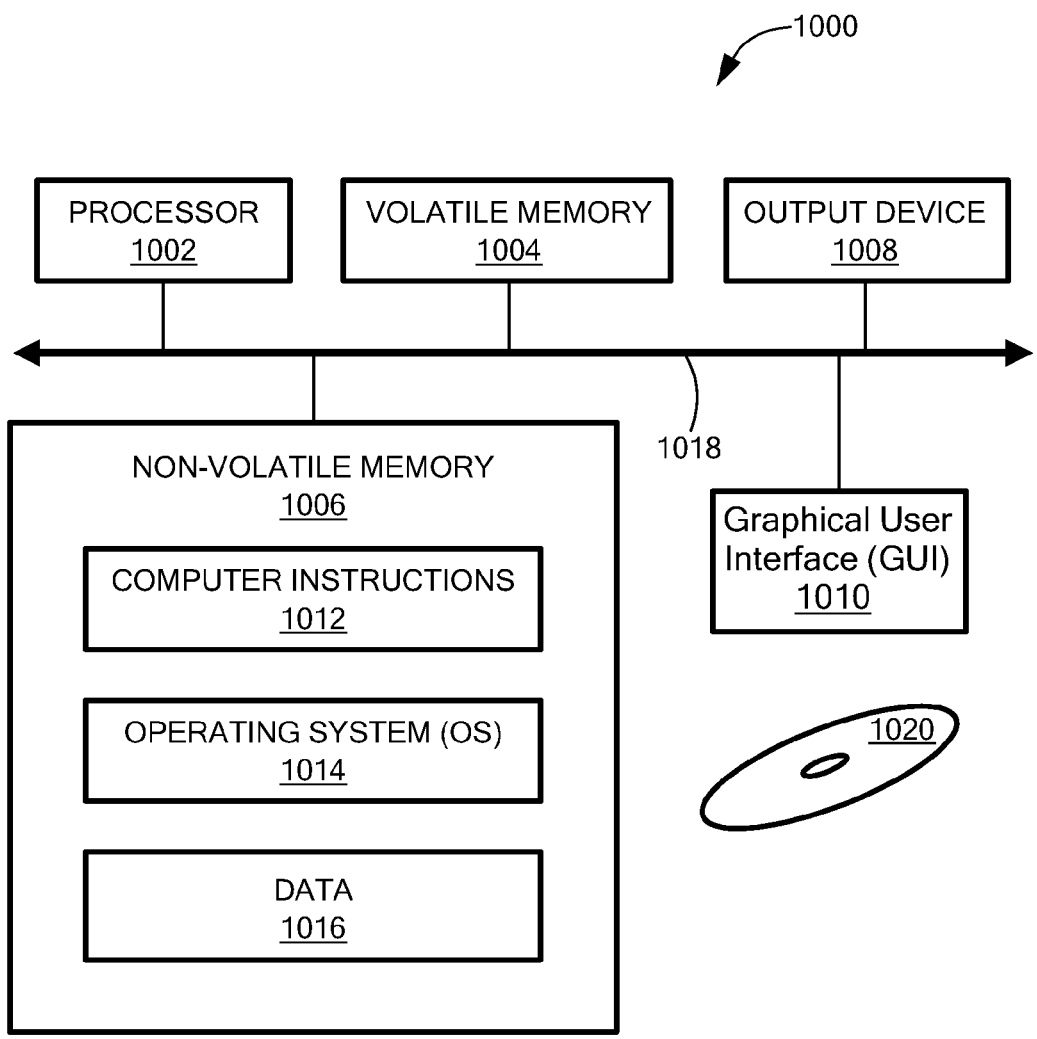
FIG. 10 is a schematic representation of a computer for use with the systems and methods FIGS. 1-9.

FIG. 10 shows an exemplary computer or other processing device 1000 that can perform at least part of the processing described herein. The computer 1000 includes a processor 1002, a volatile memory 1004, a non-volatile memory 1006 (e.g., hard disk), an output device 1008 and a graphical user interface (GUI) 1010 (e.g., a mouse, a keyboard, a display, for example), each of which is coupled together by a bus 1018. The non-volatile memory 1006 stores computer instructions 1012, an operating system 1014, and data 1016. In one example, the computer instructions 1012 are executed by the processor 1002 out of volatile memory 1004. In one embodiment, an article 1020 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as special purpose logic circuitry (e.g., an FPGA (field programmable gate array) and/or an ASIC (application-specific integrated circuit)).

All references cited herein are hereby incorporated herein by reference in their entirety.

A non-transitory machine-readable medium may include but is not limited to a hard drive, compact disc, flash memory, non-volatile memory, volatile memory, magnetic diskette and so forth but does not include a transitory signal per se.

Having described certain embodiments, which serve to illustrate various concepts, structures, and techniques sought to be protected herein, it will now become apparent to those of ordinary skill in the art that other embodiments incorporating these concepts, structures, and techniques may be used. Accordingly, it is submitted that that scope of the patent should not be limited to the described embodiments but rather should be limited only by the spirit and scope of the following claims.

What is claimed is:

1. A computer-implemented method comprising:
    parsing source code;
    identifying, in the source code, a declaration comprising an object reference and a handler function;
    identifying, in the source code, a statement de-referencing the referenced object; and
    generating machine code representative of the statement, the machine code comprising:
        an instruction to copy an offset associated with the de-referencing to a register corresponding to the handler function input;
        an instruction to call the handler function; and
        an instruction to copy a memory address from a register corresponding to the handler function output.

2. The method of claim 1 wherein the memory address is associated with a storage class memory (SCM) device.

3. The method of claim 1 wherein the handler function copies data from a first memory device to a second memory device and the memory address is associated with the second memory device.

4. The method of claim 1 wherein the handler function validates the offset.

5. The method of claim 1 wherein the declaration is identified by a compiler directive.

6. The method of claim 1 wherein the object reference comprises a pointer.

7. The method of claim 1 wherein the memory address is a virtual memory address.

8. The method of claim 1 wherein the memory address is a associated memory-mapped file.

9. The method of claim 1 further comprising:
 identifying, in the source code, a persistent object declaration; and
 associating the declared persistent object with a persistent data segment.

10. A computer program product tangibly embodied in a non-transitory computer-readable medium, the computer-readable medium storing machine code generated from source code having a declaration comprising an object reference and a handler function, the machine code executable to:
 copy an offset associated with the de-referencing to a register corresponding to the handler function input;
 call the handler function; and
 copy a memory address from a register corresponding to the handler function output.

11. The computer program product of claim 10 wherein the memory address is associated with a storage class memory (SCM) device.

12. The computer program product of claim 10 wherein the handler function copies data from a first memory device to a second memory device and the memory address is associated with the second memory device.

13. The computer program product of claim 12 wherein the handler function validates the offset.

14. The computer program product of claim 10 wherein the object reference comprises a pointer.

15. The computer program product of claim 10 wherein the memory address is a virtual memory address.

16. The computer program product of claim 10 wherein the memory address is a associated with a memory-mapped file.

17. A storage system comprising:
 a processor;
 a memory device; and
 a computer-readable medium storing machine code generated from source code having a declaration comprising an object reference and a handler function, the machine code executable to:
  copy an offset associated with the de-referencing to a register corresponding to the handler function input;
  call the handler function; and
  copy a memory address from a register corresponding to the handler function output.

18. The storage system of claim 17 wherein the memory device is a first memory device, wherein the storage system further comprises a second memory device, and wherein the handler function copies data from a first memory device to a second memory device and the memory address is associated with the second memory device.

19. The storage system of claim 17 wherein the handler function validates the offset.

\* \* \* \* \*